United States Patent [19]

Bergström et al.

[11] Patent Number: 4,811,957
[45] Date of Patent: Mar. 14, 1989

[54] DEVICE FOR ACCOMPLISHING AT LEAST A LIQUID TIGHT JOINT AND A METHOD FOR MANUFACTURING SUCH A DEVICE

[75] Inventors: Magnus Bergström, Bjärred; Per-Stefan Gersbro; Jan-Olof Fransson, both of Lund, all of Sweden

[73] Assignee: AB Akerlund & Rausing, Sweden

[21] Appl. No.: 127,489

[22] Filed: Dec. 1, 1987

[30] Foreign Application Priority Data

Dec. 11, 1986 [SE] Sweden ................ 8605318

[51] Int. Cl.$^4$ .................... F16J 15/14; B29F 1/00
[52] U.S. Cl. ........................... 277/1; 277/207 A; 277/DIG. 6; 264/328.1
[58] Field of Search ........ 277/1, 207 A, 237, DIG. 6; 264/328.1, 328.8; 220/2.1 A

[56] References Cited

U.S. PATENT DOCUMENTS

| 2,799,123 | 7/1957 | Van Steenis | 220/2.1 A X |
| 3,002,645 | 10/1961 | Kegg | 220/2.1 A |
| 3,037,834 | 6/1962 | Lederer et al. | 220/2.1 A X |
| 4,210,618 | 7/1980 | Piltz et al. | 264/328.1 X |
| 4,358,417 | 11/1982 | Beinhauer | 277/1 X |
| 4,448,324 | 5/1984 | Jeppsson et al. | 220/266 |

FOREIGN PATENT DOCUMENTS

| 1189240 | 3/1965 | Fed. Rep. of Germany ... 220/2.1 A |
| 860147 | 7/1986 | Finland . |
| 2161573 | 7/1973 | France . |

Primary Examiner—Robert S. Ward
Attorney, Agent, or Firm—Lerner, David, Littenberg, Krumholz & Mentlik

[57] ABSTRACT

A device and a method for forming at least a liquid tight joint between two elements. Either or both elements have sealing portions, which in an area intended for abutment of the elements provide said joint when said elements are brought together in the abutment area. The sealing portion is formed as a seal which by being formed by sequential injection moulding technique is molecularly integral with an area directly adjacent to said seal. The injection moulding technique allows a choice of a relatively softer material for the sealing portion and a high degree of design freedom, including designs of high hygiene standards, especially well suited for aseptic or sterile packaging systems.

11 Claims, 3 Drawing Sheets

DEVICE FOR ACCOMPLISHING AT LEAST A LIQUID TIGHT JOINT AND A METHOD FOR MANUFACTURING SUCH A DEVICE

FIELD OF THE INVENTION

The present invention relates to sealing devices and more precisely to seals of the type which are able to provide at least a liquid tight joint between two elements. Such a joint may be used for instance when interconnecting pipes or pipe studs or when terminating a certain pipe length.

The invention is especially applicable at manufacturing techniques where it is desirable to allow a high degree of design flexibility and a wide choise of materials.

The technique according to the invention is particularly useful when manufacturing components to be included in aseptic or sterile systems, for instance packaging systems.

BACKGROUND OF THE INVENTION

Starting out from a known injection moulding technique, so called sequential injection moulding, which for instance is described in U.S. Pat. No. 4,448,324, according to the present invention, the actual technique is given a brand new utility, i.e. the possibility of providing high hygiene seals and manufacturing techniques for such.

The insight that the sequential injection moulding technique allows the production of transition regions which are unnoticeable for the eye and not at least—in sterile systems —unnoticeable for bacteria and other micro-organisms, such unnoticeable or not existing transitions existing between regions of different injection mouldable materials, means the provision of a wide, new perspective within the technique relating to sealingly joining components.

The technique suggested according to the present invention does also reduce the number of elements otherwise necessary for sealing purposes.

SUMMARY OF THE INVENTION

The present invention provides a device for forming at least a liquid tight joint between two elements, comprising a sealing portion arranged at either or both ends of the element, said portion giving said joint in an area intended for abutment of said elements when said elements are brought together in the abutment area.

The device is characterized in that the sealing portion comprises a seal manufactured by sequential injection moulding technique integral with a region of said element at least directly adjacent to said sealing portion, said seal being of a material which is of a relatively softer material than said adjacent region.

In one embodiment the seal continues into the said adjacent region, at outwardly facing free surfaces thereof, by transition surface portions forming continuously integral surfaces with the adjacent surface portions of the seal.

In one specific embodiment the seal is arranged as a circumferencial seal around the edge of an opening in either element.

The seal may be placed in a mounting flange around the opening and define the edge of the flange facing the inside of the opening.

Preferably, the sealing portion or seal is formed from an injection mouldable material having a long term resiliency.

In a specific embodiment the said adjacent region is injection moulded of a thermo-plastics material, for instance HD-polyethylene, and the sealing portion or seal is injection moulded of a material of the type "PERSTORP DRYFLEX 6".

The invention does also provide a method for manufacturing a device for accomplishing of at least a liquid tight joint between two elements, comprising a sealing portion arranged in either or both elements, which sealing portion in a region intended for abutment of said elements forms said joint when said elements are brought together in the abutment area.

The method is characterized in that the sealing portion or portions and region or regions immediately adjacent thereof are formed by sequential injection moulding, and that for the sealing portion there is used a relatively softer or more resilient material than for the area or areas immediately adjacent thereof.

In one embodiment the sealing portion is injection moulded such that there is formed a soft transition into adjacent regions of an element, without the formation of any contamination collecting pockets.

Preferably, the sealing portion is formed from a material having a long term resiliency.

In one embodiment the sealing portion is formed by sequential injection moulding as the inner, circumferencial edge portion of a flanged opening.

DETAILED DESCRIPTION OF THE INVENTION

Figure 1:
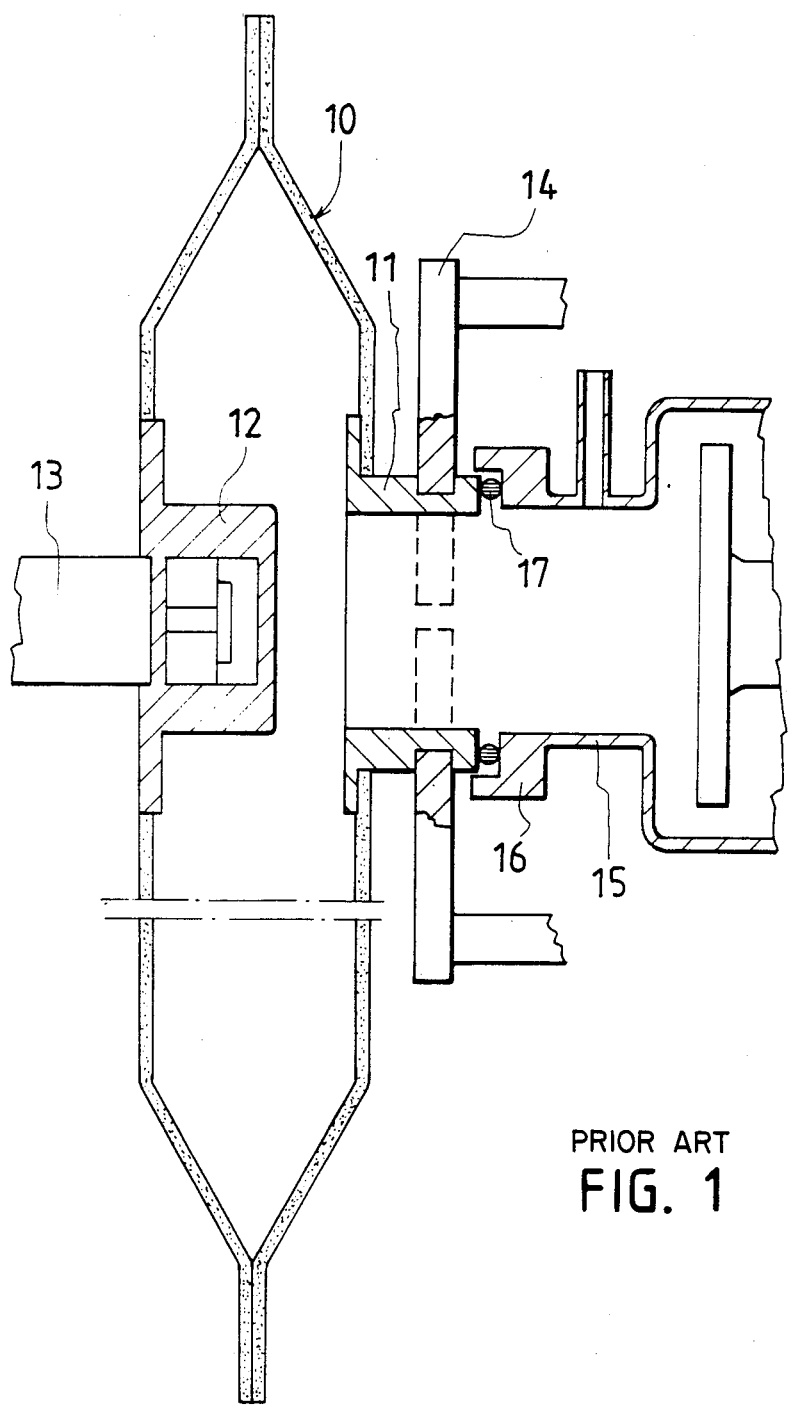
FIG. 1 shows a known method for aseptically filling a flexible packaging container where a conventional sealing device is used between the filling pipe and the container.

The reference numerial 10 in FIG. 1 shows a flexible packaging container having a stud 11 attached to one side thereof, and where a joint element 12 of the male type is arranged for being placed inside the stud for sealing the package. In the condition shown in FIG. 1 the package 10 is in the final filling stage and is maintained in filling position by means of a support rod 13 which grips the male element 12 internally, and by means of a pair of support fingers 14 gripping the female element 11 externally.

The flanged end 16 of a filling pipe 15 is brought against the female element 11. There is maintained a compressing pressure between the flange 16 and the female element 11, such that a circumferencial sealing ring 17 provides the intended sealing function.

Figure 2:
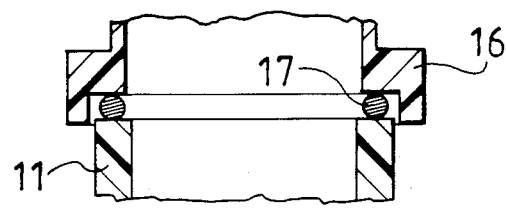
FIG. 2 shows the conventional sealing device in partial section.

In FIG. 2, in partial section, there is shown the interaction between three elements which in this case are necessary for the sealing procedure. The seal should be at least liquid tight, but in view of the fact that the system primarily is intended for aseptic or sterile handing, the seal should of course in such an application form an efficient barrier or lock against penetration of gas, vapour and micro-organisms.

Figure 3:
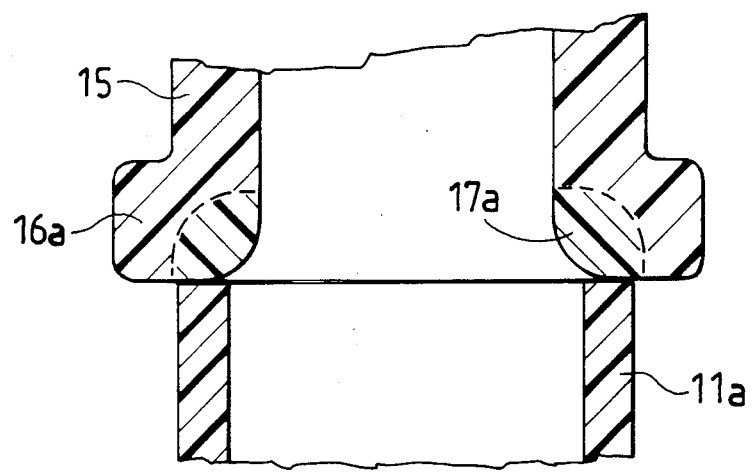
FIG. 3 shows a device according to the present invention for sealing in a corresponding application and FIG. 4 shows a further utility for the seal according to the invention.

According to the present invention the seal in FIG. 3 is proposed, where the stud 11a is pressed against the flange part 16a of a filling pipe 15. The flange part 16a and the visible part of the filling pipe in FIG. 3 are manufactured from a plastics material, for instance HD-polyethylene, and the sequential injection moulding technique mentioned has been used such that a circumferencial sealing portion 17a is formed.

In this particular embodiment said sealing portion has been injection moulded from a relatively softer material than the material of the part 16a and 15. Such a material may for instance be the one sold under the trade name "PERSTORP DRYFLEX 6".

The sealing portion 17a merges into the flange portion 16a, in the areas not visible from the outside, by a molecular bond between the molecules of the material of the element 17a and the material of the element 16a, respectively. For the rest, in the sections of the transitions facing outwardly, the structure has continuous and smooth surface sections, and there is no way of identifying, neither by the eye or at an microorganism level, any recesses or corresponding which might act as hearths for bacterial growth.

According to the embodiment in FIG. 3, the element 11a is of a material which is relatively harder than the material of the sealing portion 17a and may for instance consist of the same plastics material as the elements 16a, 15, i.e. HD-polyethylene.

Figure 4:
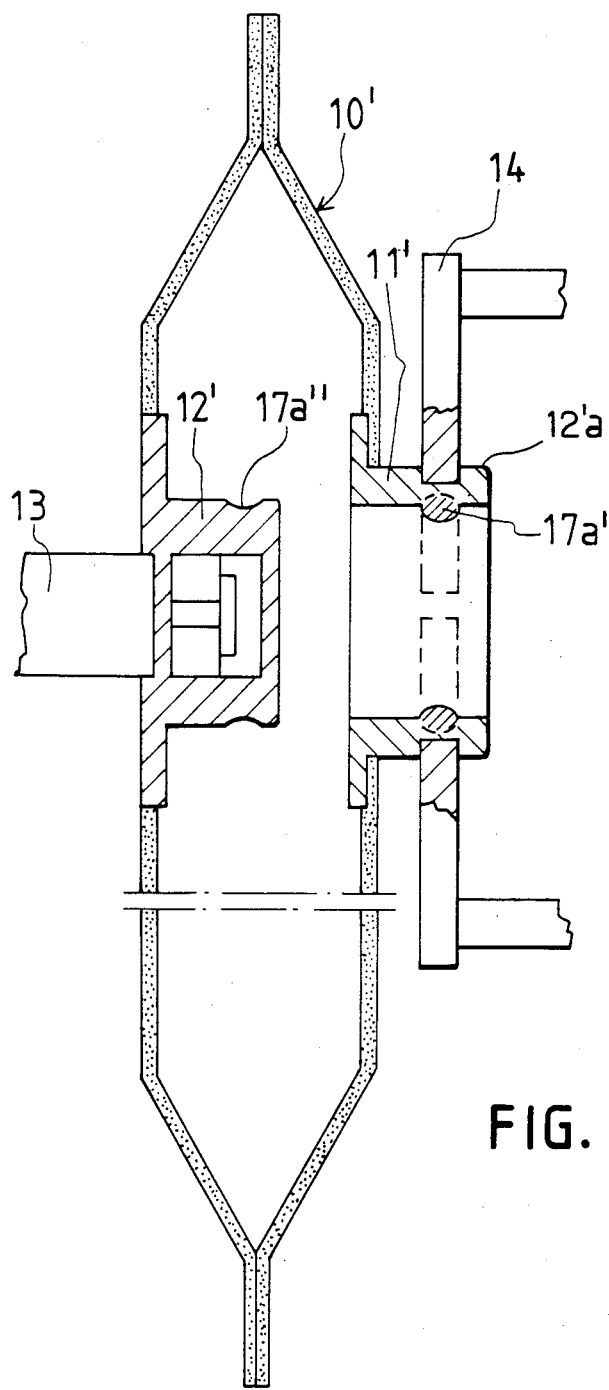

In FIG. 4 there is a packaging container 10' basically of the same type as in FIG. 1, but where the male and female parts 12' and 11' of the container closure include an integral seal 12'a formed by sequential injection moulding, i.e. the female part 11' and the circumferential sealing ring 17a' are formed by sequential injection moulding. A molecular bond is obtained between the part 11' and the ring 17a' and, additionally, there will be no contamination collecting pockets at the exposed border region, instead the molecular bond allows the formation of a perfectly smooth transition region at the surface facing the inside of the female part 11'.

In FIG. 4 the seal 17a' cooperates with a groove 17a" in the male part 12' and, basically, the seal is of the radial seal type. However, the sequential injection moulding technique does also allow the formation of axial type of seals, i.e. seals of the type in FIG. 3. The type of material relation in FIG. 4 basically is the same as in FIG. 3. The softer, long term resilient material of the ring 17a' should, however, as the material of the ring 17a in FIG. 3, give a molecular bond, when injection moulded, with the material of the male part 11'.

If necessary, the groove 17a" may also be formed by applying the sequential injection moulding technique.

Within the packaging field the parts 11, 12 and 11', 12' form what is called a spout, i.e. a reclosable closure, especially well suited for bag-in-box systems.

In one further development of the seal structure and the manufacturing technique thereof, the seal is injection moulded by said sequential injection moulding technique from a self-sterilizing termoplastics material. Such material compositions are known in general terms and may for instance include chemical systems creating ozone when exposed to oxidization.

Although the invention has been exemplified in connection with a specific embodiment it is realised that the inventive idea is restricted merely by the contents of the accompanying claims.

We claim:

1. In a device for forming an at least liquid tight joint between two elements, comprising a sealing portion arranged in at least one of said elements, said sealing portion forming said joint in an area intended for abutment of said elements when said elements are brought together in said abutment area, the improvement:

that said sealing portion comprises a seal manufactured by sequential injection moulding technique integral with at least a region of said element directly adjacent to said sealing portion, for forming a molecular bond between said seal and said region, and that said seal of of a relatively softer material than said adjacent region.

2. A device as in claim 1, wherein said seal merges into said adjacent region, at outwardly free surfaces thereof, by transition surface portions forming continuous, integral surfaces with the surface portions adjacent to the seal.

3. A device as in claim 2, wherein the seal is arranged as a circumferencial seal extending inside an opening in at least one element.

4. A device as in claim 3, wherein the seal is placed in the mounting flange around the opening and defines an edge facing the inside of the opening.

5. A device as in claim 1, wherein the sealing portion is manufactured from a material having a high long term resiliency.

6. A device as in claim 1, wherein said seal is manufactured from a material having a self-sterilization capability.

7. A method for manufacturing a device for forming at least a liquid tight joint between two elements, comprising a sealing portion arranged in at least one of said elements, said sealing portion forming said joint in an area intended for abutment of said elements when said elements are brought together in the abutment area, comprising the steps of:

forming the sealing portion and the area directly adjacent thereof by sequential injection moulding, and selecting for the sealing portion a resiliently softer material than for the area directly adjacent thereof.

8. A method as in claim 7, wherein the sealing portion is injection moulded such that it smoothly merges into adjacent areas of respective elements without forming contamination collecting pockets.

9. A method as in claim 8, wherein the material of the sealing portion is a material having a long term resiliency.

10. A method as in claim 8, wherein the sealing portion is formed by sequentially injection moulding an inner circumferential portion of an opening.

11. A device as in claim 1, wherein the seal is manufactured from a material having a high long-term resiliency.

* * * * *